US007739099B2

(12) United States Patent
Liu et al.

(10) Patent No.: US 7,739,099 B2
(45) Date of Patent: Jun. 15, 2010

(54) METHOD AND SYSTEM FOR ON-LINE PERFORMANCE MODELING USING INFERENCE FOR REAL PRODUCTION IT SYSTEMS

(75) Inventors: Zhen Liu, Tarrytown, NY (US); Honghui (Cathy) Xia, Briarcliff Manor, NY (US); Fan Zhang, North Bergen, NJ (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 11/315,692

(22) Filed: Dec. 22, 2005

(65) Prior Publication Data

US 2007/0168494 A1 Jul. 19, 2007

(51) Int. Cl.
*G06F 7/60* (2006.01)
*G06F 9/45* (2006.01)
*G06F 11/30* (2006.01)
*G06F 15/173* (2006.01)
*G06F 9/44* (2006.01)

(52) U.S. Cl. ............................ 703/22; 703/2; 702/182; 709/223; 717/104

(58) Field of Classification Search ................... 703/22, 703/2; 702/182; 709/223; 717/104
See application file for complete search history.

(56) References Cited

U.S. PATENT DOCUMENTS

| 5,881,268 | A  | * | 3/1999 | McDonald et al. ............ 703/21 |
| 6,691,067 | B1 | * | 2/2004 | Ding et al. .................. 702/186 |
| 6,738,955 | B2 | * | 5/2004 | Andersen et al. .............. 716/4 |
| 6,973,415 | B1 | * | 12/2005 | Saghier et al. .............. 702/186 |
| 2004/0111508 | A1 | * | 6/2004 | Dias et al. ................... 709/224 |
| 2005/0086335 | A1 |  | 4/2005 | Liu et al. |

OTHER PUBLICATIONS

Moises Goldszmidt et al., "On The Quantification of e=Business Capacity" Proceedings of the 3rd ACM Conference on Electronic Commerce; pp. 235-244; Oct. 2001.

* cited by examiner

*Primary Examiner*—Paul L Rodriguez
*Assistant Examiner*—Nithya Janakiraman
(74) *Attorney, Agent, or Firm*—Tutunjian & Bitetto, P.C.; Kenneth Corsello, Esq.

(57) ABSTRACT

A system and method for performance modeling for an information technology (IT) system having a server(s) for performing a number of types of transactions includes receiving data for system topology and transaction flows and receiving performance measurement data for the IT system. The measurement data is clustered into multiple regimes based on similarities. Service demand and network delay parameters may be inferred based on clustered data.

21 Claims, 3 Drawing Sheets

METHOD AND SYSTEM FOR ON-LINE PERFORMANCE MODELING USING INFERENCE FOR REAL PRODUCTION IT SYSTEMS

BACKGROUND

1. Technical Field

The present invention relates to performance modeling of information technology (IT) systems. More specifically, the present invention relates to the online performance modeling using inference for real production IT systems.

2. Description of the Related Art

Performance modeling has been of great theoretical and practical importance in the design, engineering and optimization of computer and communication systems and applications for several decades. A modeling approach is particularly efficient in providing architects and engineers with qualitative and quantitative insights about the system under consideration.

However, as Information Technology (IT) matures and expands in the scope of available applications, IT systems increase at an increasing rate in both size and complexity. For example, today, a typical Web service hosting center may have hundreds of nodes and dozens of different applications simultaneously running on it. Each of the nodes in turn has often multiple processors and layered caches. These nodes make use of both local and shared storage systems. The size and complexity of such systems make performance modeling much more difficult, if at all tractable. Detailed modeling, fine tuning and accurate analysis can be carried out only on very small systems or very small components in a system.

In addition, due to the rapid evolution of hardware technology, components in these systems are upgraded at a much higher pace than in the recent past, in order to meet demand and to improve the Quality of Service (QoS) parameters of performance and availability. Hence, performance modeling should be done in a very short time frame in order for the model and analysis to be relevant.

These constraints made performance modeling work on modern IT systems very expensive, and often unaffordable. In order to obtain relatively accurate performance evaluation results with a short turnaround time, i.e., before the system under consideration becomes obsolete, heavy investments are necessary in human and computer power.

On the other hand, IT systems have become critical in most businesses. Losses of millions of dollars per minute when a company's IT system goes down are well-documented. Thus, it is natural that users impose more and more stringent QoS requirements on their systems. In the case of IT outsourcing, service-level agreements (SLA) signed between the parties stipulate, among other things, the service quality guarantees, often with associated penalties in case of violations. As a consequence, predictive modeling is truly vital in the capacity planning and QoS management of such systems.

To build performance models in a short time frame, where typically there is no time to set up any testing environment, one should consider to tune the model on-line using performance data from production IT system. There are some fundamental challenges in doing so, since the production system is a non-controlled environment. The workload is typically volatile, non-stationary, having peak/off-peak regimes, and also having daily and weekly or seasonal patterns. There is no detailed knowledge of the transaction mix as it is also transient.

Furthermore, there are only limited monitoring/performance measurements that can be collected to help model development so that such measurements are not too intrusive to the production system. Such monitoring and performance measurements are typically collected through periodic probing from various geographic locations, which incur a further challenge in the sense that such end-to-end delay measurements include different and also transient network delays as they are from different geographic locations.

Queuing network models have been and continue to be the most popular paradigm for the performance analysis of such systems (See, e.g., L. Kleinrock; *Queueing Systems Volume II: Computer Applications*; John Wiley and Sons, 1976; and D. Menasce and V. Almeida; *Capacity Planning for Web Performance*; Prentice hall, 1998). People also use discrete event simulation methodology to model a complex IT system. This type of approach requires feeding detailed modeling parameters to the simulation engine, but direct measurement of these parameters in general is very costly, time consuming and very intrusive to the production system.

SUMMARY

There is a need for tools, systems and methods aimed at automating the process of performance modeling and optimization of online production IT infrastructure and applications so as to reduce both the equipment and labor costs, and shorten the turn-around time in performance assessment, prediction and capacity planning. Such systems and methods should be able to deal with the dynamic changes in real-time which are common in on-line production IT systems, including the volatile, non-stationary behavior, peak/off-peak regimes, and the daily and weekly or seasonal patterns.

A system and method for performance modeling for an information technology (IT) system having a server(s) for performing a number of types of transactions includes receiving data for system topology and transaction flows and receiving performance measurement data for the IT system. The measurement data is clustered into multiple regimes based on similarities. Service demand and network delay parameters may be inferred based on clustered data.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
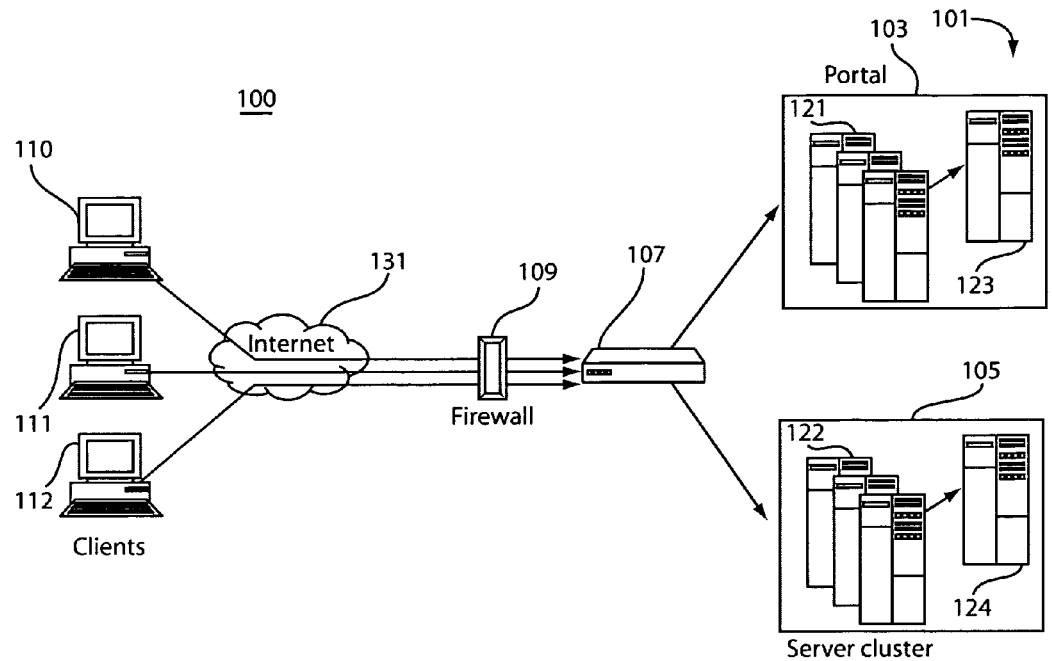
FIG. 1 illustrates an exemplary e-business site architecture which may be modeled in accordance with the present invention.

Systems and methods for online performance modeling for real production Information Technology systems are provided. Embodiments include receiving online performance measurement data of end-to-end delays and server utilizations, receiving data of transaction flows and system topology and reorganizing the measurement data into multiple regimes using clustering algorithms. Service demand parameters are inferred based on the multiple regime clustered measurement data, and an optimization algorithm based on minimum distance between predicted and measured response times may be used to infer the performance parameters. Further, online prediction and cost optimization methods are introduced to conduct prediction, what-if analyses, and cost-effective system design.

In view of the foregoing problems, drawbacks, and disadvantages of the conventional approaches, one aspect of the present invention combines clustering, queuing models and inference techniques to automate a process of on-line performance modeling and optimization of real time production IT systems and applications.

Methods of the present invention use clustering techniques to deal with the fact that the workload of a production system is non-stationary in both traffic intensity and transaction mix. Clustering algorithms in accordance with aspects of the present invention are applied to reorganize the monitored performance measurement data based on similarities, so that the performance data are grouped into multiple regimes to be considered separately in the model building.

With the re-organized performance data, further advanced inference technologies are presented to build the underlying queuing network model and tools in an automatic way. The inference takes into account the fact that the performance data is collected from multiple probing stations at different geographic locations, and considers the discrepancy of the network delays from different geographic locations. Embodiments of the present invention may include as input the most common and inexpensive measurements. Such measurements may include, for example, the system throughput, utilization of the servers, end-to-end response times, etc.

With the above methods and systems, performance models can be built for any given system configuration with any application. Since the model can be automatically re-calibrated on the fly by consistently feeding in live performance data, the model can be applied both in development and maintenance phases such as in dot releases, and therefore the model can quickly adapt to the fast evolution of the production system (in both hardware and software upgrades).

As a by-product, computer processing unit (CPU) utilizations of different applications/transactions in different machines/servers are estimated. This is a non-intrusive alternative to detailed instrumentation technologies. Such an approach could be very useful for billing based on utilizations.

In one embodiment of the invention, the IT system may be characterized with the use of closed-form equations. In that embodiment, the inference method may include the steps of deriving the end-to-end response time formulas based on the closed-form equations; formulating the inference (parameter estimation) problem based on the performance metrics that are available; inputting the end-to-end response times for transactions and the server utilization data into the inference problem formulation; and solving the inference problem for the model parameters (service demand per transaction per server) so that the distance from the performance metrics produced by the model to the measured is minimized.

Another embodiment of the present invention may address a situation where closed form expressions are not available. In that situation, a discrete event simulator together with a set of meta-heuristic search methods may be used to obtain the optimized performance parameters. The meta-heuristic search methods can guide the search to generate a next candidate parameter setting. The simulator for the model may be used to evaluate the performance metrics for the candidate parameter setting. The meta-heuristic search methods may be used again to generate a next candidate parameter setting based on the performance metrics for the current and past candidate settings. This procedure can repeat until a given stopping criterion is satisfied. The output of the procedure is the current best estimate of the parameter setting.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention provides for automatic online performance modeling and tools for real production IT systems and applications. One aspect of the present invention includes using clustering techniques to deal with the fact that the workload of production system is non-stationary in both traffic intensity and transaction mix. Advanced clustering algorithms are applied to reorganize the monitored performance measurement data based on similarities, so that the performance data are grouped into multiple regimes to be considered separately in the model building.

With the re-organized performance data, further advanced inference technologies are presented to build the underlying queuing network model in an automatic way. The inference takes into account the fact that the performance data is collected only from multiple probing stations at different geographic locations, and considers the discrepancy of the network delays from different geographic locations. The present invention preferably uses as input the most common and inexpensive measurements. Such measurements include, for example, the system throughput, utilization of the servers, and end-to-end response times.

Embodiments of the present invention offer a number of attractive features and advantages over conventional approaches. For example, one embodiment utilizes advanced clustering techniques to organize non-stationary transient measurement data into multiple regimes based on similarities. In addition, by relying on a high-level queuing network model and advanced inference techniques based in observing utilization and end-to-end performance data, embodiments of the present invention sidestep the problems of the traditional queuing network modeling work. The traditional queuing networks need massive low-level system monitoring and data collection.

The model building approach of embodiments of the present invention permits, building performance models in a fast and accurate fashion, especially for complicated production systems. Use of aspects of the present invention results in significant time savings compared to the conventional performance modeling approaches, which are based on manual parameter tuning. Embodiments of the present invention also permit the building of performance models on the fly based on the system monitoring information. Such a feature is particularly useful for dynamic provisioning in on-demand systems.

Embodiments of the present invention therefore provide an end-to-end, self-tuning, and flexible system/method that permits the building of online performance models on-the-fly based on the system monitoring information. It can easily be incorporated into a suite of performance engineering functions, ranging from performance prediction, to optimization of existing IT infrastructure, and design of cost-effective architectures. All of the functions may provide insight to the capabilities of a Web site, as well as a better understanding of the trade-offs between scalability, QoS, capacity cost, operations risk, etc. The present invention therefore, among other things, enables IT planners to aggressively develop and provide solutions that increase customers' infrastructure, application and service management capabilities, and to help customers to proactively manage their resources and meet their service level agreements on-demand.

Referring now to the drawings in which like numerals represent the same or similar elements and initially to FIG. 1, an e-business environment is shown to illustratively demonstrate embodiments of the present invention. Preferred embodiments of the present invention are implemented in a distributed data processing environment in which end-to-end response time and CPU utilization measurements are compiled and used for the automatic model building. A distributed data processing environment may be used for modeling an online production environment for a commercial Web site, in one useful example of the present invention.

A production IT system 100 includes e-business servers, which may be organized to have a multi-tiered architecture. This system 100 is distributed using the Internet 131; however, any network or other distributed system may be employed. In this example, a firewall 109 is employed for security; however each system may include additional or alternate network configurations, as the case may be.

For example, a site 101 may include two separate clusters of servers. A portal cluster 103 is primarily responsible for authentication-related requests. Business related requests are processed separately by a cluster of business transaction servers 105. Within each cluster, there are two or more tiers, front-end servers 121-122, and back-end database servers 123-124. Incoming requests to the site are routed to a collection of front-end servers 121-122 by a load balancing router 107, such as, for example IBM's enterprise network dispatcher (eND) (refer to, e.g. G. Hunt, G. Goldszmidt, R. King, and R. Mukherjee. Network dispatcher: A connection router for scalable Internet services. *Proceedings of the 7th International World Wide Web Conference*, April, 1998), or similar products. The router 107 routes requests in a weighted round robin fashion, so as to evenly distribute the load to the front-end servers 121-122. Processed pages are usually returned directly to clients 110-112 without going back through the router 107. The utilization of the front-end 121-122 and back-end servers 123-124 measured may be obtained continuously online.

The e-business workload, composed of transactions and requests to the e-business servers, is also quite complex. Consider for example an enterprise online shopping scenario. This interaction includes authentication transactions such as login, and business transactions such as browsing a catalog, searching for products, adding items to a shopping cart, proceeding to check out, etc. Each of these transactions uses the site's resources differently.

Transactions such as browsing may only involve the front-end application servers to fetch static pages, which is relatively inexpensive, while other transactions such as searching or checking out may involve composition of a dynamic page or multiple queries to the database that need a large amount of processing time and involve both the front-end application server and the back-end database server. In addition, user navigational patterns vary dramatically from person to person. Some users may spend all their time browsing and searching, while some frequent buyers may directly jump in for buying.

For a production system 100, the e-business workload mix is usually not well known. Even though log files recorded by the system can provide some information about load mix, they are very often incomplete. A group of geographically distributed probing stations may be used to monitor the IT system's performance. Such probing stations may routinely send out probing requests for different business transactions and measure the end-to-end response times. The end-to-end response times therefore include network delays, which usually are different for each geographical location.

Modeling becomes more challenging as the workload for an IT system used in production environment is not stationary. The workload has peak/off-peak volume, daily/weekly patterns and could be very volatile. It is thus a challenging task to assess an IT system's capability of delivering end-to-end performance assurance across the entire IT environment, given the variety of system architectures, numerous applications with different functions, and the vast diversity in user behavior.

Model Building

To ensure the feasibility of the modeling framework yet still capture the fundamentals of a complex e-business infrastructure, a queuing model is presented, which is described in a way to be neither too detailed nor too general, and to rely on a controllable number of parameters.

Figure 2:
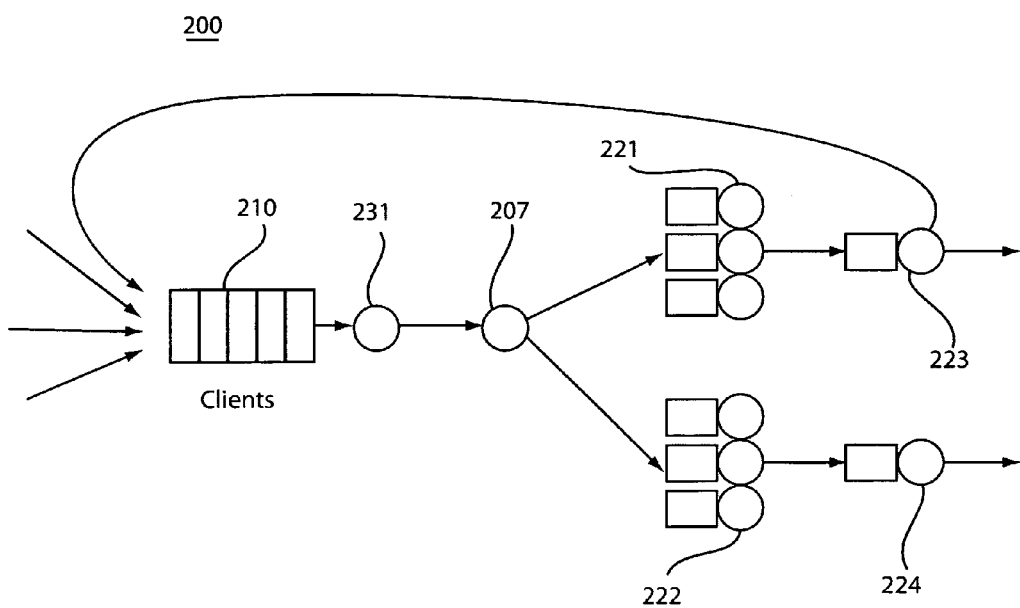
FIG. 2 illustrates an exemplary queuing model corresponding to the e-business site depicted in FIG. 1.

Referring to FIG. 2 with continue reference to FIG. 1, a high-level multi-class queuing network model 200 is described. This form of model captures major resources and delay effects and provides good traceability between the performance measures and the system architecture. Each resource component that incurs non-negligible delays will be modeled by a generic service station with queuing effect. Such a generic service station could have anywhere from one to an infinite number of servers. For example, if the delay incurred at the firewall 109 is constant and non-negligible, one could then model the firewall 109 as an infinite server station with constant service time.

Next, the transactions are characterized and profiled into different classes, so that requests within each class would follow similar paths through the various server stations and need similar service demands at each station along the path. Such profiling can be based on prior engineering knowledge or after careful workload analysis. For example, a login transaction is normally different from a buy transaction and these different transaction sessions would visit a different set of server stations and make different resource demands.

The system described with reference to FIG. 1 can be modeled as a closed queuing network 200 of FIG. 2. In FIG. 2, network 231 corresponds to Internet 131 in FIG. 1; network dispatcher 207 corresponds to router 107; and servers 221-224 correspond to servers 121-124.

To capture the multi-threaded processing in the computing environment, it may be assumed for illustrative purposes that these servers are serving jobs according the processor-sharing (PS) discipline. Since the delays incurred at the network 231 are non-negligible, such delay effects are modeled as delay servers. It is also assumed that the network 231 has constant delays (depending on the geographical location of clients).

End-to-end delay of a particular job (or transaction) may be defined for purposes of illustration to be a total response time that a user experiences from the time she issues a transaction to the time she receives the complete response as desired. Therefore, the client end-to-end delays include the network delay at the network 231 and the delays at the Web servers 221-224.

Clustering: Re-Organize Measured Performance Data

Re-organization of measured performance data of production system is provided by clustering. Traditionally, a testing system is often set up before people release an IT system to production. Using a testing system has the advantage of having a fully controlled environment. By employing aspects of the present invention, full knowledge of the workload mix and workload intensity can be known. Also, the system can be run until its steady state to collect performance measurements.

Setting up a testing system can be very expensive and time consuming. The fast evolution of IT systems often makes it difficult to justify the expenses and time for a testing system. Especially when a testing system can hardly fully mimic the production system including the real client's usage, workload mix, user behavior, system usage, network utilization, etc. Therefore, building a performance model for a production system directly becomes more desirable.

Because of the transient and volatile nature of performance measurements from production systems, it may become desirable to re-organize the monitored data into different regimes. Each regime may represent a working environment in which each server of the system is running with a constant workload. A clustering technique may be applied to capture different regimes.

K-Means Algorithm

There are many different types of clustering algorithms. The present disclosure illustrative describes the K-means algorithm since it is one of the simplest un-supervised exclusive partitioning algorithms that divide a collection of objects into K groups. Other clustering algorithms may also be employed in addition to or instead of K-means. A simple description of the K-means algorithm is as follows:

Place K points into the space represented by the objects that are being clustered. These points represent an initial group of centroids. Each object is assigned to the group that has the closest centroid. When all objects have been assigned, recalculate the positions of the K centroids. Repeat this until the centroids no longer move. This produces a separation of the objects into groups from which the metric to be minimized can be calculated.

When assigning each object to a group, a distance metric is defined. A commonly used metric for higher dimensional data is the Minkowski metric ($d_p$), $$d_p(x_i, x_j) = \left(\sum_{k=1}^{d} |x_{ik} - x_{jk}|^p\right)^{\frac{1}{p}}$$

where d is the dimensionality of the data. Two special cases of Minkowski metric are Euclidean distance and Manhattan distance, which are when p=2 and p=1 respectively. However, there are no general guiding rules for selecting p for any given application. In one embodiment, Euclidean distance is selected.

Performance Data with Multiple Regimes

Let $(R_t, \rho_t)$ denote the end-to-end delay (or other metrics used for modeling a system) and server utilization at probing time t, for $t=t_1, t_2, \ldots, t_N$. Apply the K-means algorithm to $\rho_t$'s to get K clusters, where cluster k has size $n_k$ and members $C_k = \{t_1^k, t_2^k, \ldots, t_{n_k}^k\}$. Then, the performance data for regime k is calculated as $$\bar{R}_k = \frac{1}{n_k} \sum_{t \in C_k} R_t$$

$$\bar{\rho}_k = \frac{1}{n_k} \sum_{t \in C_k} \rho_t$$

Model Parameter Calibration

In building the performance model, the parameters of the service demands are obtained for each class at each generic server in the queuing network model. Ideally, obtaining these parameter values involves directly measuring the resource consumption of each class at each device, which may be a very costly practice. A solution is to rely on performance metrics that are measurable and relatively inexpensive, such as the end-to-end response times, the CPU load information of some or all servers, etc. End-to-end response time, which may be defined as the time from initiation of a request from the user, until the time that the user receives a response, can be measured easily. In fact, companies often set specific targets for these end-to-end delays so as to guarantee a satisfactory user experience. CPU load information is another metric used for Web service performance monitoring. Other metrics may also be employed.

The present invention may utilize a general inference methodology to infer these service time parameters using the most common measurements such as the system throughput, utilization of the servers, and end-to-end response times. Due to the stochastic nature of the IT system, it is hard to pin-point which measurement set is the best. Thus, a set of inferred parameters may be defined as "optimal" if the resulting performance of the IT system model is "closest" to the measured performance. The distance between two different performance metrics can be general, e.g., the weighted average across different components or classes.

The inference methodology applied in the present invention may include two aspects. If the underlying queuing network model has closed-form performance expressions (or good analytic approximations), then its performance can be formulated as a function of the unknown service demand parameters and a solver or other optimization tool may be used to obtain the optimal parameter settings. The above model building process is illustratively depicted in FIG. 3, which shows an implementation of the present invention.

An example will next be described for a system having I servers, J different transaction types (job classes) in the underlying queuing network model. The following input parameters and performance measures are assumed to be given:

J:=number of job classes;
I:=number of service stations;
L:=number of probing stations;
$\upsilon_{ji}$:=number of times that a class j job visits station i;
$E_{jl}^m$:=measured end-to-end delay of class j jobs probed from probing station l;
$\rho_i^m$:=measured utilization of service station i.

The following parameters and performance metrics are to be estimated:

$s_{ji}$:=mean service requirement of class j jobs at station i;
$n_{jl}$:=mean network delay of class j jobs probed from probing station l;
$R_{ji}$:=mean response time of class j jobs at station i;
$T_{ji}$:=$\upsilon_{ji}R_{ji}$, total mean response time of class j jobs (sum of multiple visits) at station i;
$E_{jl}^e$:=estimated end-to-end delay of class j jobs probed from probing station l.

Denote further in matrix format that:
S={$s_{ji}$}J×I; (Service Times)
N={$n_{jl}$}J×L; (Probing Delays)
T={$\upsilon_{ji}R_{ji}$}J×I; (Multiple-visit Response Time Matrix)
$E^m$={$E_{jl}^m$}J×L; (Measured End-to-end Delay)
$E^e$={$E_{jl}^e$}J×L; (Estimated End-to-end Delay)
$\rho^m$={$\rho_i^m$}I×1; (Measured Server Utilization)

To make the model tractable, the generic service stations are assumed to be either delay centers, e.g., modeled as infinite server (IS) queues (and will later be referred as IS-stations), or finite capacity service stations operated under the processor-sharing (PS) service discipline (will later be referred as PS-stations).

Then the arrival rate of class j jobs at station i is $$\lambda_{ji}=\upsilon_{ji}\lambda_j$$

and the total job arrival rate at station i is $$\lambda^{(i)} = \sum_{j=1}^{J} \lambda_{ji} \; i=1,\ldots,I.$$

The total traffic intensity at station i is $$\rho_i = \sum_{j=1}^{J} \rho_{ji}$$
$$= \sum_{j=1}^{J} \upsilon_{ji}\lambda_j s_{ji}, i=1,\ldots,I.$$

Since all service stations are assumed to be either infinite server (IS) or processor sharing (PS) stations, (both are symmetric queues), the underlying queuing network is a quasi-reversible network. Based on queuing theory, for a PS station, the mean response time $R_{ji}$ for class j jobs at station i is given by:

$$R_{ji} = \frac{L_{ji}}{\lambda_{ji}} = \frac{s_{ji}}{1-\rho_i}.$$

For an IS station, the mean response time $R_{ji}$ for class j jobs at station i is given by:

$$R_{ji}=s_{ji}.$$

Therefore, the end-to-end delay for class j jobs can be derived as follows:

$$E_j = \sum_{i \in H(j), i \in IS} s_{ji} + \sum_{i \in H(j), i \in PS} \frac{s_{ji}}{1-\rho_i}.$$

Based on above response time formulae, statistical inference techniques may be applied to search for the optimal set of parameters so that the resulting performance is the closest to the measured performance, $$\min \|E^m - E^e\|$$

here the distance $\|E^m - E^e\|$ can be general, e.g., absolute difference, maximum difference, weighted sum of absolute differences, or weighted sum of least square errors, etc. The multiple regimes resulting from the clustering may now be treated to formulate the inference problem.

Single Regime:

A single regime will be focused on first to derive a corresponding quadratic parameter inference program. The extension to multiple experiments is presented later.

The estimated total end-to-end delay for class j jobs probed from probing station l is the sum of the network delay and the delay (response time) at the server. That is, $$E_{jl}^e = n_{jl} + T \cdot 1_{l \times 1} = n_{jl} + S_j \cdot D(V_j) \cdot \beta$$

where $$\beta_i = \begin{cases} \frac{1}{1-\rho_i^m}, & \text{if } i \text{ is a } PS\text{-station} \\ 1, & \text{if } i \text{ is an } IS\text{-station} \end{cases}$$

and $S_{j.}$ and $V_{j.}$ stand for the j-th row of matrix S={$s_{ji}$} and V={$v_{ji}$} respectively, and $D(V_{j.})$ is the diagonal matrix of $V_{j.}$.

The parameter estimation optimization problem is thus to find the service requirements S and probing delay N such that the weighted least squared error is minimized. This problem has been rewritten so that the differences between measured and estimated values of the parameters appear in the definitional constraints, and the sum of squared deviations is minimized from those differences. In other words, a quadratic program is solved subject to non-negativity constraints on the service requirements, $s_{ji}$, and probing delays, $n_{jl}$, that is, $$\min_{s} \sum_{j=1}^{J} \sum_{l=1}^{L} \delta_{jl}^2$$

s.t. $E_{jl}^e(s) - E_{jl}^m = \delta_{jl}, j = 1, \ldots, J, l = 1, \ldots, L$ $s_{ji} \geq 0, j = 1, \ldots, J; i = 1, \ldots, I.$ $n_{jl} \geq 0, j = 1, \ldots, J; l = 1, \ldots, L.$ The optimization problem can then be re-stated as the following quadratic program in standard form:

$$(QP) \quad \min \quad \frac{1}{2} x^T H x$$

s.t. $Ax = b;$ $x_k \geq 0, k = 1, \ldots, J \times (I + L).$ where $$x = \begin{bmatrix} \tilde{x} \\ \tilde{\tilde{x}} \\ \delta \end{bmatrix}, H = \begin{bmatrix} 0_{J \times (I+L)} & 0 \\ 0 & 2I_{JL \times JL} \end{bmatrix}$$

with $\tilde{x}$ and $\tilde{\tilde{x}}$ representing the network delays $\{n_j\}$'s and service times $\{s_{ji}\}$'s, expressed as a vector rather than a matrix. Particularly, $\tilde{x}_k := n_{jl}$ if $k = (j-1) \times L + l$ and $\tilde{\tilde{x}}_k := s_{ji}$ if $k = (j-1) \times I + i \cdot \delta = \{\delta_{jl}\}$ and $$A = \begin{bmatrix} 0_{K \times JL} & A_v & 0_{K \times JL} \\ I_{JL \times JL} & A_s & -I_{JL \times JL} \end{bmatrix}$$

with $$A_{vst} = \begin{cases} 1, s = 1, \ldots, K; t = (j-1) \times I + i \text{ and } v_{ji} = 0 \\ 0, \text{otherwise} \end{cases}$$

$$A_s = \begin{bmatrix} \beta_1 V_1^T & \cdots & 0_{1 \times J} \\ \vdots & \ddots & \vdots \\ 0_{1 \times J} & \cdots & \beta_l V_l^T \end{bmatrix}$$

And $$b = \begin{bmatrix} b_v \\ b_s \end{bmatrix}$$

where $b_v = 0_{K \times 1},$ $b_{sk} = E_{il}^m, k = (j-1) \times L + l.$

Multiple Regimes: General Formulation of the Inference Problem

As described previously the inference, or parameter estimation, problem may be reduced to that of minimizing the sum of squared deviations from the measured parameter values. For any set of measurements in any particular regime, the above model may be solved, to obtain the appropriate parameter set for that regime.

However, as is the case with any parameter estimation problem arising from a series of experiments, it may be insufficient to simply solve the above quadratic inference problem for a single experiment. In practice, due to the load process being non-stationary, the measured data are partitioned into multiple load regimes.

The entire set of regimes is included in the parameter estimation step to obtain as much data on the full range of the parameters as possible, especially in the presence of nonlinear queuing effects.

Suppose that data from N regimes is available, each providing an estimate of the matrix, $H^n$ and constraint values, $X^n$, based on the input parameters given within that experiment, $\rho^n, E^n, \ldots$ The goal of the inference problem over the set of multiple experiments is therefore to find a robust vector of parameters, x that best represents the parameters obtained by solving the inverse parameter estimation problem for each experiment, yet is able to detect and eliminate outlying experiments.

$$\min \frac{1}{2} x^T \sum_{n=1}^{N} H^n x$$

s.t. $A^n x = b^n; n = 1, \ldots, N$ $x_k \geq 0, k = 1, \ldots, J \times (I + L).$ The above QP approach that combines all experiments into a single optimization problem may be employed to infer the corresponding parameters, in particular, to infer the network delays $\{n_{jl}\}$'s and service times $\{s_{ji}\}$'s.

Figure 3:
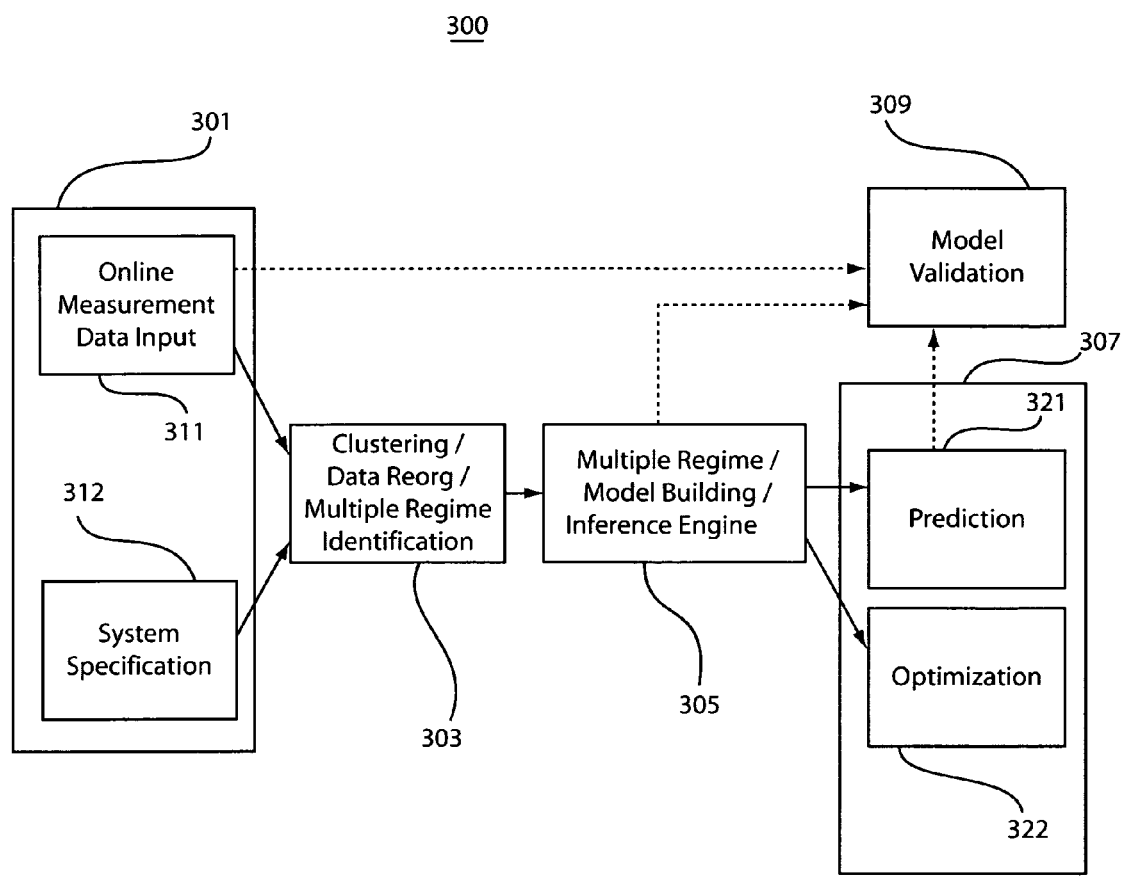
FIG. 3 illustrates a block/flow diagram of a system/method for modeling an IT system by inferring data based upon clustering in accordance with one embodiment of the present invention.

Referring to FIG. 3, one implementation of the methodology 300 of the present invention is illustratively shown. A modeling system 300 includes four modules 301, 303, 305, and 307. Each module performs different methods that make the automation of the modeling process possible. A module 301 handles data and system configuration input functions. A module 303 may perform clustering functions so as to reorganize the online measurement data into multiple regimes. A module 305 may perform model-building functions which include building a queuing model and a core inference engine. A module 307 may perform performance prediction and cost optimization functions. Each module may include hardware and software features and may include a software module or set of algorithms that can be executed by one or more computer devices as described above.

Module 301 may perform two initial steps: (i) understand the system architecture in block 312, and (ii) collect online measurement data in block 311 which include the end-to-end delay measurements and per server utilization data, although other metrics may be employed. In one embodiment, module 303 applies clustering algorithms and organizes the online measurement data into groups based on similarities. Requests in different clusters may differ in terms of time of the day, geographical location, rate at which transactions are taking place, and the service times needed to process the requests, etc.

Module 305 then maps the system architecture into a network of generic servers. The different clusters of requests (resulted from profiling) are mapped into multiple regimes, with each regime may have different performance in terms of server delay, network delay, etc. Module 307 makes use of the queuing equations in block 321 and the optimization formulation in block 322 described above to infer the unknown network and service demand parameters. A module 309 may use part of the dataset to train the model and the remaining dataset to validate the model. In fact, the above learning procedure can be repeated and the model can be refined as more measurements become available. When the validation results are satisfactory and stable, a performance model is then fully developed. Thus, to obtain a valid performance model is simply to obtain the optimized inferred parameters.

Once a valid performance model has been established, the queuing formulae earlier can then be used to predict (in block 321) performance, optimize (in block 322) existing IT infrastructure, and to suggest cost-effective architecture design through deployment and operations. These functions may be implemented in modules 321 and 322.

As an example, to predict the performance under a different workload, (say the predicted load with expected future business growth), the input load may be plugged into an analytical queuing formula to obtain the expected delay and resource utilization under the predicted load. Based on the output performance metrics and resource utilization metrics, the system of the present invention may determine the level of service quality that can be delivered for each service with the current infrastructure, the location of the bottleneck of the system, etc.

Similarly, the inferred model from module 321 can be used to understand the scalability and analyze a series of what-if scenarios. For example, to answer the question 'what if the front-end server capacity is doubled', one simply needs to modify the queuing formulas accordingly. The output will immediately provide the answer.

In an e-business environment, it may be important for IT planners to associate economic factors with capacity. Module 322 can further provide cost optimization functions that quantify cost-performance trade-offs. From the total cost of providing the e-business infrastructure and the capacity utilization, the cost per transaction, cost of each service, and the cost to support each customer can be computed.

Figure 4:
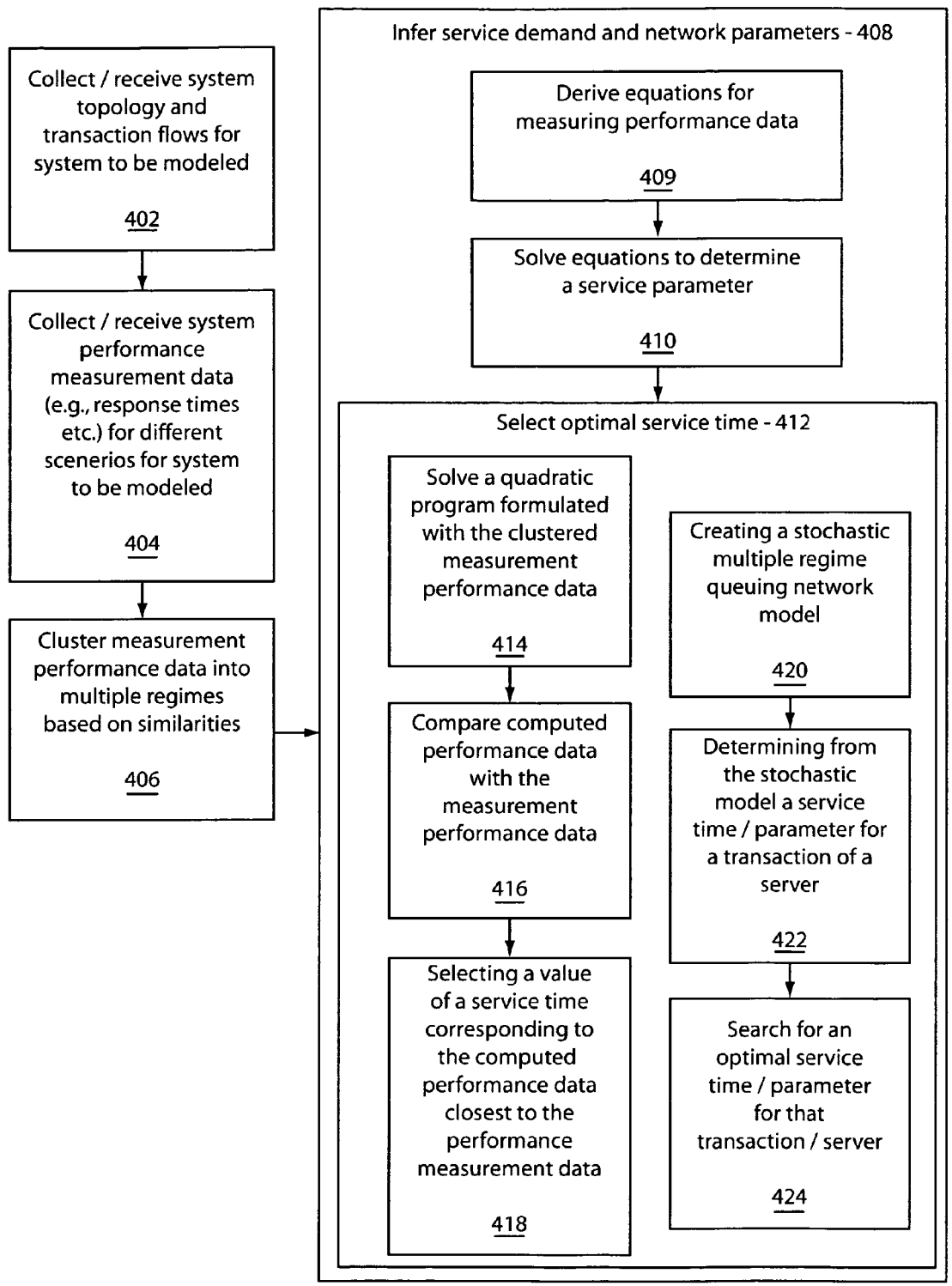
FIG. 4 is a block/flow diagram of a system/method for modeling an IT system in accordance with another embodiment of the present invention.

Referring to FIG. 4, a block/flow diagram illustratively shows a system/method for performance modeling for an information technology (IT) system having one or more servers for performing a number of types of transactions for an exemplary embodiment. In block 402, data for system topology and transaction flows is collected and received for the system to be modeled. This may include receiving at least one modeled queue corresponding to at least one component of the system.

In block 404, performance measurement data for the IT system is determined. This may include receiving end-to-end response times of transactions carried out by the production IT system under a plurality of different scenarios. The scenarios may include transactions from multiple geographical locations, and/or at multiple times of the day or continuously. Online server utilization of the IT system continuously or at multiple times of the day may be received to be evaluated for modeling. In this way the model or models may perform based on dynamic conditions experienced by the system to be modeled.

In block 406, the performance measurement data is clustered into multiple regimes based on similarities. For example, K-means or other clustering algorithms may be employed.

In block 408, inferring service demand and network delay parameters based on clustered data is performed. This may include inferring service times of transactions handled by the one or more servers and network delay parameters from multiple geographical locations based on clustered multiple regime measurement data. The inferring may include deriving equations for the performance measurement data in block 409 and solving the equations to find at least one value corresponding to a service time for a transaction handled by one of the servers in block 410. In block 412, an optimum value of service time may be selected.

The step of selecting an optimum value (block 412) may include, in block 414, solving a quadratic program formulated with the clustered multiple regime performance measurement data, and comparing, in block 416, computed performance data with the received performance measurement data, and, in block 418, selecting a value of a service time corresponding to the computed performance being closest to the performance measurement data.

In an alternate embodiment, block 414 includes creating a stochastic multiple regime queuing network model of the IT system in block 420, obtaining from the stochastic model at least one value corresponding to service time for a transaction handled by a server in block 422, and searching for an optimum value of service time in block 424.

Having described preferred embodiments of a method and system for on-line performance modeling using inference for real production it systems (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for performance modeling for an information technology (IT) system having one or more servers for performing a number of types of transactions, comprising:
   receiving data for system topology and transaction flows;
   receiving performance measurement data for the IT system;
   clustering the performance measurement data into multiple regimes based on similarities;
   deriving equations for the performance measurement data; and
   flexibly predicting service demand and network delay parameters based on the equations and the clustered performance measurement data using a processor, such that online performance models are dynamically created and updated.

2. The method as recited in claim 1, wherein receiving data for system topology and transaction flows includes receiving at least one modeled queue corresponding to at least one component of the system.

3. The method as recited in claim 1, wherein receiving performance measurement data includes receiving end-to-end response times of transactions carried out by the production IT system under a plurality of different scenarios.

4. The method as recited in claim 3, wherein the scenarios include transactions from multiple geographical locations, and/or at multiple times of the day or continuously.

5. The method as recited in claim 1, wherein receiving performance measurement data includes receiving online server utilization of the IT system continuously or at multiple times of the day.

6. The method as recited in claim 1, wherein predicting service demand and network delay parameters based on the clustered performance measurement data includes inferring service times of transactions handled by the one or more servers and network delay parameters from multiple geographical locations based on the clustered multiple regime performance measurement data.

7. The method as recited in claim 1, wherein predicting service demand and network delay parameters based on the clustered data includes:
solving the equations to find at least one value corresponding to a service time for a transaction handled by one of the servers; and
selecting an optimum value of service time.

8. The method as recited in claim 7, wherein the step of selecting an optimum value comprises:
solving a quadratic program formulated with the clustered multiple regime performance measurement data;
comparing computed performance data with the received measurement performance data; and
selecting the value of a service time corresponding to the computed performance data being closest to the performance measurement data.

9. The method as recited in claim 1, wherein the step of predicting includes:
creating a stochastic multiple regime queuing network model of the IT system;
obtaining from the stochastic model at least one value corresponding to service time for a transaction handled by a server; and
searching for an optimum value of service time.

10. A computer readable medium storing a computer program to perform method steps for modeling for an information technology (IT) system having one or more servers for performing a number of types of transactions, the method steps comprising:
receiving data for system topology and transaction flows;
receiving performance measurement data for the IT system;
clustering the performance measurement data into multiple regimes based on similarities;
deriving equations for the performance measurement data; and
flexibly predicting service demand and network delay parameters based on the equations and the clustered performance measurement data, such that online performance models are dynamically created and updated.

11. The computer readable medium as recited in claim 10, wherein receiving data for system topology and transaction flows includes receiving at least one modeled queue corresponding to at least one component of the system.

12. The computer readable medium as recited in claim 10, wherein receiving performance measurement data includes receiving end-to-end response times of transactions carried out by the production IT system under a plurality of different scenarios.

13. The computer readable medium as recited in claim 12, wherein the scenarios include transactions from multiple geographical locations, and/or at multiple times of the day or continuously.

14. The computer readable medium as recited in claim 10, wherein receiving performance measurement data includes receiving online server utilization of the IT system continuously or at multiple times of the day.

15. The computer readable medium as recited in claim 10, wherein predicting service demand and network delay parameters based on the clustered data includes inferring service times of transactions handled by the one or more servers and network delay parameters from multiple geographical locations based on the clustered multiple regime performance measurement data.

16. The computer readable medium as recited in claim 10, wherein predicting service demand and network delay parameters based on the clustered data, includes:
solving the equations to find at least one value corresponding to a service time for a transaction handled by one of the servers; and
selecting an optimum value of service time.

17. The computer readable medium as recited in claim 16, wherein the step of selecting an optimum value comprises:
solving a quadratic program formulated with the clustered multiple regime measurement data;
comparing computed performance data with the received measurement performance data; and
selecting the value of a service time corresponding to the computed performance data being closest to the performance measurement data.

18. The computer readable medium as recited in claim 10, wherein the step of predicting includes:
creating a stochastic multiple regime queuing network model of the IT system;
obtaining from the stochastic model at least one value corresponding to service time for a transaction handled by a server; and
searching for an optimum value of service time.

19. A system for modeling for an information technology (IT) system having one or more servers for performing a number of types of transactions, comprising:
a first module which receives data for system topology, transaction flows and performance measurement data for the IT system to be modeled and stores said data in a memory medium;
a clustering module which clusters the measurement data into multiple regimes based on similarities;
an inference module which derives equations for the performance measurement data; and
a flexible predicting module to infer service demand and network delay parameters based on the equations and clustered data using a processor to form a model to simulate operations and conditions of the IT system under a plurality of conditions, such that online performance models are dynamically created and updated.

20. The system as recited in claim 19, further comprising a module for performing performance prediction and optimization of performance by permitting a plurality of parameters to be altered to improve modeling of the IT system.

21. The system as recited in claim 19, further comprising a model validation module to refine a model based upon available data.

* * * * *